United States Patent
Ganguly et al.

(10) Patent No.: US 6,345,266 B1
(45) Date of Patent: Feb. 5, 2002

(54) PREDICATE INDEXING FOR LOCATING OBJECTS IN A DISTRIBUTED DIRECTORY

(75) Inventors: Sukanta Ganguly, Orem, UT (US); Chin Ming Kuo; Cheng Yang, both of Milpitas, CA (US)

(73) Assignee: Novell, Inc., Provo, UT (US)

(*) Notice: Subject to any disclaimer, the term of this patent is extended or adjusted under 35 U.S.C. 154(b) by 0 days.

(21) Appl. No.: 09/398,685

(22) Filed: Sep. 20, 1999

Related U.S. Application Data (60) Provisional application No. 60/113,870, filed on Dec. 23, 1998.

(51) Int. Cl.$^7$ .............................................. G06F 17/30
(52) U.S. Cl. ..................... 707/1; 707/2; 707/5; 707/10; 709/203; 709/239; 713/201; 714/38
(58) Field of Search ................................ 707/3–4, 1, 2, 707/5, 10, 100, 3.4, 103 R, 104.1, 501.1; 709/203–207, 226, 229; 713/201; 714/4, 38

(56) References Cited

U.S. PATENT DOCUMENTS

| | | | |
|---|---|---|---|
| 5,659,727 A | * 8/1997 | Velissaropoulos et al. | 707/2 |
| 5,790,778 A | * 8/1998 | Bush et al. | 714/38 |
| 5,794,232 A | 8/1998 | Mahlum et al. | 707/3 |
| 5,870,739 A | 2/1999 | Davis, III et al. | 707/4 |
| 5,873,079 A | 2/1999 | Davis, III et al. | 707/3 |
| 5,884,304 A | 3/1999 | Davis, III et al. | 707/4 |
| 6,006,331 A | * 12/1999 | Chu et al. | 713/201 |
| 6,014,667 A | 1/2000 | Jenkins et al. | 707/10 |
| 6,049,799 A | 4/2000 | Mangat et al. | 707/10 |
| 6,081,814 A | * 6/2000 | Mangat et al. | 707/501 |
| 6,098,108 A | * 8/2000 | Sridhar et al. | 709/239 |
| 6,157,925 A | 12/2000 | Jenkins et al. | 707/10 |
| 6,157,942 A | * 12/2000 | Chu et al. | 709/203 |

FOREIGN PATENT DOCUMENTS

| WO | WO 95/30981 | * 11/1995 | G09G/5/26 |
|---|---|---|---|
| WO | WO 96/16375 | * 5/1996 | G06F/17/30 |

OTHER PUBLICATIONS

Bennett, J.M. et al., "An Analysis of Replication Strategies for X.500–like Distributed Directories", Proceedings of the 1990 Workshop on the Management of Replicated Data, Nov. 8–9, 1990, pp. 137–142.*

(List continued on next page.)

*Primary Examiner*—Hosain T. Alam
*Assistant Examiner*—Shahid Alam
(74) *Attorney, Agent, or Firm*—Cesari and McKenna, LLP

(57) ABSTRACT

The invention relates to a distributed directory service that is constructed based on a predicate, i.e., a query from a client. The predicate is formed by the query (request) issued by the client. The predicate is used as an index for retrieving data from a plurality of directory servers. Retrieving the data has the following steps. Each directory server is designated by a designation predicate giving a range of data values stored in the directory server. A client predicate indicates desired information. The client predicate is compared with the designation predicates to determine which directory servers may contain information requested by the client predicate. In the event that a particular designation predicate indicates that a portion of the desired information may be stored on a particular directory server, an inquiry is sent to the particular directory server for the desired information. The retrieved information is transferred to the client computer. The predicate is used to form an index by sorting the predicate into a normal form. Steps in sorting the predicate into the normal form include the following. Each symbol of the predicate is represented by a numerical representation, for example the ASCII value used to represent the symbol in ordinary text files. The logical connectors and the predicates are sorted in numerical order of the numerical representation to form the normal form of the predicate. The directory may be chosen to be a database.

10 Claims, 10 Drawing Sheets

OTHER PUBLICATIONS

Kille, S. E., "Implementing the Directory", 1990 IEE Colloquium on Global Directory, pp. 5/1–5/4.*

C. Weider, J. Reynolds, S. Heker, Technical Overview of Directory Services Using the X.500 Protocol, RFC 1309. DISI Working Group, 3/92, pp. 1–16.

W. Yeong, T. Howes, S. Kille, X.500 Lightweight Directory Access Protocol, Jul. 1993, RFC 1487 pp. 1–21.

M. Wahl, T. Howes, S. Kille, Lightweight Directory Access Protocol (v3), Dec. 1997, RFC 2251 pp. 1–50.

* cited by examiner

PCACHE TABLE
700

| PREDICATE PRIMITIVE | ID. NUMBERS OF DATA FILES |
|---|---|
|  |  |
|  |  |
|  |  |
| TITLE = CONSULTANT | 1, 2, 3, 4, 5, 6 |
|  |  |
|  |  |
|  |  |
|  |  |
|  |  |
|  |  |
|  |  |
|  |  |
|  |  |

| PREDICATE<br>(FIRST ORDER DISJUNCTIVE NORMAL FORM) | ID. NUMBERS OF DATA FILES |
| --- | --- |
| | |
| (PHONE BEGINS WITH 408) AND (TITLE = CONSULTANT) | 1 |
| | |
| | |
| | |
| | |
| | |
| | |
| | |
| | |
| | |
| | |
| | |
| | |
| | |

HINT TABLE

BACKEND CONFIGURATION TABLE
900

| backendaddress# | INITIATING POINT | IP ADDRESS | PORT NUMBER | ADMIN. LOGIN ID | ADMIN. PASSWORD |
|---|---|---|---|---|---|
| backend #1 ID | ou=s2, ou=s3, o=water, c=us | 151.155.35.118 | 389 | cn=manager, o=water, c=us | novellpass |
| backend #2 ID | ou=s4, ou=s3, o=water, c=us | 151.155.35.149 | 389 | cn=manager, o=water, c=us | novellpass |
| backend #3 ID | ou=s5, ou=s3, o=water, c=us | 151.155.35.118 | 389 | cn=manager, o=water, c=us | novellpass |
| backend #4 ID | ou=s4, ou=s3, o=water, c=us | 151.155.35.149 | 389 | cn=manager, o=water, c=us | novellpass |

PREDICATE INDEXING FOR LOCATING OBJECTS IN A DISTRIBUTED DIRECTORY

RELATED APPLICATIONS

This appln claims benefit of Prov. No. 60/113,870 filed Dec. 23, 1998.

This application is related to U.S. patent application Ser. No. 09/398,684, filed on even date with this application, of Chin Ming Kuo and Sukanta Ganguly entitled, PREDICATE INDEXING OF DATA STORED IN A COMPUTER, WITH APPLICATION TO INDEXING CACHED DATA, all disclosures of which are incorporated herein by reference.

FIELD OF THE INVENTION

This invention relates to indexing information stored in a computer system, and more particularly to indexing data stored in different directory servers of a distributed directory service.

BACKGROUND OF THE INVENTION

It is common for computer users ("clients") interconnected by an institutional intranet or local area network to gain access to various remote (directory) server sites via an internetwork of computers, such as the well-known Internet communications network. It is also common in network applications to provide a so-called proxy server that links to the internetwork. A proxy server accesses frequently requested data from the remote servers and stores it locally to effectively speed-up access and reduce the download time of future requests for the data. In response to a request from an application executing on a client, the proxy server attempts to fulfill that request from its local storage; if it cannot, the proxy server forwards the request over the internetwork to a server that can satisfy the request. The server then responds by transferring a stream of data to the proxy server, which stores and forwards the data onto the client.

The term "client" is also used to refer to a computer used by a person, the "user". Accordingly, the user's computer is referred to as the "client computer".

The requests issued from the client and proxy server to the server conform to a conventional protocol, such as the lightweight directory access protocol (LDAP). Specifically, the LDAP protocol provides a client-server communication arrangement to access a directory service over a Transmission Control Protocol/Internet Protocol (TCP/IP) network. Examples of a directory service include the NetWare Directory Services (NDS) from Novell, Inc. and the X.500 directory service. Novell's Directory Access Protocol (NDAP) is a gateway on NDS that conforms with LDAP. NDS, X.500 and the LDAP protocol are well-known and described in the following documents: *Novell Directory Services Internals Overview; Technical Overview of Directory Services Using the X.500 Protocol, RFC* 1309; *X.500 Lightweight Directory Access Protocol, RFC* 1487; *Lightweight Directory Access Protocol (v3), RFC* 2251.

A directory differs from a database in an essential characteristic, a directory is designed for ease of changing the data stored therein on a dynamic basis. In ordinary database design, the data is stored in fields of tables, and is accessed and written to and read from using a designated protocol. To change data in a database requires both deleting the data presently there and writing in desired new data. Both the deleting and writing are accomplished by using the command structure of the protocol.

In contrast, a directory is architected so that the access protocol permits easy access to changing data stored in the directory. Protocols for dynamically changing data stored in a directory are designed to make dynamical changes to the data easy and able to be accomplished with a minimum of steps executed by the user, or his/her client computer. An example of directory operation and protocol is given in the Lightweight Directory Access Protocol (LDAP).

The LDAP protocol is described in many books, in particular in the following two books: the first book, by Timothy A. Howes, Mark C. Smith, and Gordon S. Good entitled *Understanding and Deploying LDAP Directory Services*, published by Macmillan Technical Publishing, Copyright date 1999; and second book, by Timothy A. Howes and Mark C. Smith entitled *LDAP, Programming Directory Enabled Applications with Lightweight Directory Access Protocol*, published by Macmillan Technical Publishing, Copyright date 1997, and all disclosures of both books are incorporated herein by reference.

A difference between a directory and a database can be expressed by the statement that a directory can include a database, but a database ordinarily cannot include a directory. A reason is that data may be stored in a directory much as it is stored in a database, but the access to a directory for dynamic changes in the stored data is better than access to a database. In the following discussion attention will be primarily directed to directories. However, as is clear from this discussion, a database could also be used in the discussion, with the exception that to use a database would make access for dynamic changes in the data more cumbersome.

In this document, the conventional protocol used to issue requests from a client is a lightweight directory access protocol (LDAP) and the source server used to store data is an LDAP or NDAP/NDS server. The predicate proxy server stores ("caches") data retrieved from the server and further builds dynamic indexes for searching the cached data stored on the proxy cache. Notably, searching and storage of data on the proxy server is based on the predicate generated by the predicate logic core of the proxy server.

Any database management system may be used in the following description and used in the practice of the following invention. However, because of ease of reference, any database system, and any directory service, will be referred to as an "LDAP" directory service, whether or not it uses the LDAP protocol. That is, the present discussion is not limited to any specific protocol utilized by standard LDAP Lightweight Directory Access Protocol, even though the terminology "LDAP server" is used to refer to any electronically stored database.

The variants (types) of data stored in the LDAP (and NDAP and any directories using any other protocol) directories are typically small to make it easier for applications to directly access the data with a fully-qualified distinguished name; a distinguished name is a technique (similar to the Domain Naming System) for accessing data uniquely within a directory store. However, as the amount of data types stored in an LDAP/NDAP directory increases, it becomes increasingly difficult for an application and associated programs to access all the data and know about all their respective types. The directory may, for instance, contain different types (categories) of data such as printer identifiers (IDs), electronic mail (e-mail) addresses and Internet Protocol (IP) addresses.

Companies typically configure their directory servers such that each server stores a subset of data types and, notably, the subsets (data types) do not overlap. For instance, a company may have two LDAP servers (Server A and Server B). All corporate human resource related information (employee IDs, email and residential addresses, emergency contacts, salaries, etc) are stored on LDAP Server A, whereas all corporate research and development work, including the various projects under development along with interactions between development groups (both external and internal to the company), are stored on LDAP Server B. Having a database use a plurality of database servers is referred to as a "distributed database", and a system using a distributed database is referred to as a "distributed database system".

The subsets of data stored on the LDAP servers are thus reduced and non-overlapping, primarily to avoid overloading each server. LDAP is a database which operates on a schema, i.e., a format of data that the database stores and understands. A directory server (such as LDAP or NDAP) that is configured to increase the amount of data types it stores (e.g., all possible data formats used in an organization) has a complex schema and processing (including searching) of any request is time consuming and inefficient. Attempts by an organization to develop a searching algorithm for such a schema involve use of hash-based, index searching; however, such searching is also quite complex, resulting in overloading of the server and degradation of its performance.

Hash-based indexing is a way of formulating hints that result in faster look-ups; yet indexes generally consume substantial overhead (such as memory and processor cycles) when developing keys for searching the database. Moreover, updates to a hash-based index searching service may adversely affect processing performance of the server because the updates are directed to the indexes as well as to the database itself. Thus, such an approach results in substantial resource commitments that nevertheless degrade performance of the server.

An improved method of indexing a plurality of directory servers connected as a distributed directory is needed.

SUMMARY OF THE INVENTION

The invention relates to a distributed directory service that is constructed based on a predicate, i.e., a query from a client. Broadly stated, the predicate is formed by the query (request) issued by the client. The predicate is used for retrieving data from a plurality of directory servers, and retrieving the data has the following steps. Each directory server, of the plurality of directory servers, is designated by a designation predicate giving a range of data values stored in the directory server. A client predicate is generated to indicate desired information. The client predicate is compared with at least one of the designation predicates to determine which directory servers may contain information requested by the client predicate, and in the event that a match between the client predicate and a particular designation predicate indicates that at least a portion of the desired information may be stored on a particular directory server pointed to by the particular designation predicate, an inquiry is sent to the particular directory server for the desired information. The desired information is retrieved from the particular directory server in the event that the client predicate designates information stored on the particular directory server. The retrieved information is transferred to the client computer.

The predicate is used to form an index by sorting the predicate into a normal form. Steps in sorting the predicate into the normal form include the following. Each symbol of the predicate is represented by a numerical representation, for example the ASCII value used to represent the symbol in ordinary text files. The predicate is expressed as a plurality of primitive predicates, and individual predicates of the plurality of primitive predicates are joined by logical connectors. The logical connectors, and each term in the primitive predicates are represented by the numbers, and the numbers are chosen so that each different logical connector and each different term in the plurality of predicates is represented by a unique number. The logical connectors and the predicates are sorted in numerical order of the unique numbers to form the normal form of the predicate. The normal form of the predicate permits the predicate to serve as an index. The directory may be chosen to be a database.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION OF AN ILLUSTRATIVE EMBODIMENT

The invention relates to a directory proxy caching system that is constructed based on a predicate, i.e., a query from a client. Broadly stated, the predicate is formed by the query (request) issued by the client. That is, the data stream format of a request issued by a client in accordance with a conventional protocol is translated by a predicate proxy logic core of a proxy cache server to a searching probe that is used to efficiently access (elaborate) data stored in a cache of the proxy cache server. The elaborate data includes data components and each entry of the cache is formed by complex Boolean relationships among these data components. If the data is not presently stored in the proxy cache, the predicate proxy core generates another request according to the conventional protocol that is sent to a source server to retrieve the elaborate data, which is then stored on the proxy server and forwarded onto the client.

In summary, the predicate logic core translates a conventional query from a client into a predicate used as the basis of (i) a probe/tool for searching/storing elaborate data on the internal cache of the proxy server and (ii) a directed request to retrieve the elaborate data from a remote server in the event the data is not present in the internal cache. Further, the a predicate form is used to identify which database servers of a distributed system of database servers may possibly contain the data requested by a client predicate.

An advantage of the invention is that a system administrator does not have to change the database schema to store elaborate data, and to change hardware resources such as memory and number of database servers in a distributed database system.

Figure 1:
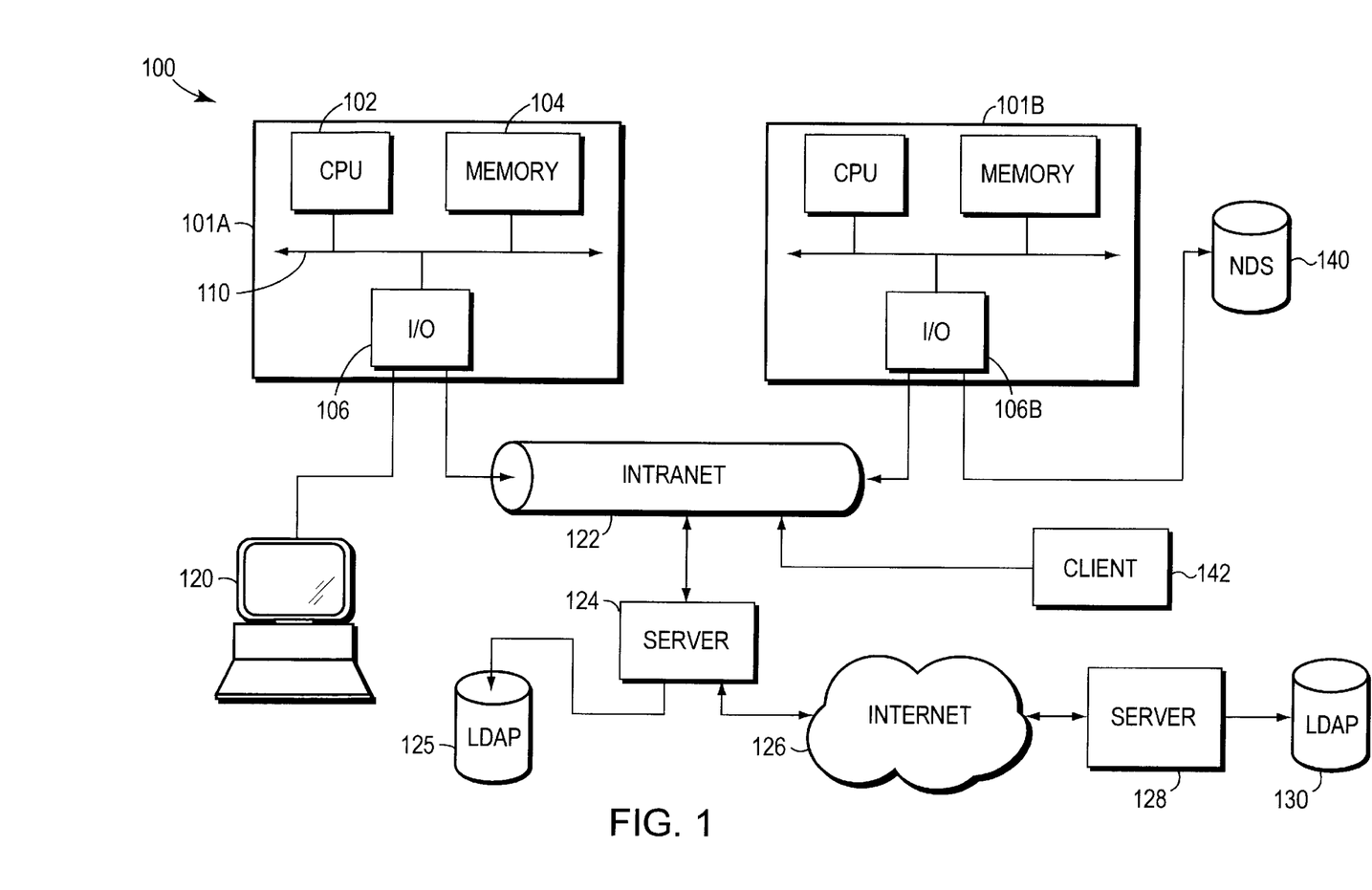
FIG. 1 is a block diagram of a computer internetwork including a collection of network segments connected to a plurality of client and server computers.

Turning now to FIG. 1, there is shown a schematic block diagram of a computer internetwork comprising a collection of network segments connected to a plurality of computers (personal computers, workstations, etc.). Each computer 101A, 101B, etc. generally comprises a central processing unit (CPU) 102, a memory 104 and an input/output (I/O) unit 106 interconnected by a system bus 110. The memory 104 may comprise storage locations typically composed of random access memory (RAM) devices, which are addressable by the CPU 102 and I/O unit 106. An operating system, portions of which are typically resident in memory and executed by CPU 102, functionally organizes the computer by, inter alia, invoking network operations in support of application programs executing on the CPU 102. An example of such an application program is the novel predicate proxy core of the present invention.

The I/O unit 106 connects to video screen and keyboard unit 120 for communication with a user. Also I/O unit 106 connects to local area network intranet 122. Intranet 122 connects to server 124. Server 124 provides access to LDAP directory 125. Server 124 may provide a gateway to the Internet, and to other servers such as server 128 through the Internet 126. Server 128 provides access to LDAP directory 130.

Computer 101B has a connection from I/O unit 106B to NetWare Directory Services (NDS) directory 140. Additional clients such as client 142 connect to intranet 122.

The network segments may comprise local area networks or intranets, point-to-point links and an Internet cloud. Collectively, the segments are interconnected by intermediate stations, such as a network switch or router, and configured to form an internet-work of computers that communicate by exchanging data packets according to a predefined set of protocols, such as the Transmission Control Protocol/Internet Protocol (TCP/IP). It should be noted that other techniques/protocols, such as Internet Packet Exchange (IPX) protocol, the Hypertext Transfer Protocol (HTTP) and, as described further herein, the lightweight directory access protocol (LDAP), may be advantageously used with the present invention.

The internetwork is preferably organized in accordance with a client/server architecture wherein the certain of the personal computers and workstations are configured as clients for interaction with users and others of the computers are configured as servers that perform services as directed by the clients. For example, the servers may operate as remote servers configured to provide directory services over a TCP/IP network. The LDAP protocol provides a client-server communication arrangement to access such a directory service, examples of which include the NetWare Directory Services (NDS) and Novell's Directory Access Protocol (NDAP) gateway to NDS, along with the X.500 directory service. An internetwork environment in which the invention may be advantageously used is an organization that has multiple, existing LDAP servers that store different kinds of data.

In the illustrative embodiment, the inventive predicate proxy core may reside on the same platform as the directory server or it could reside on a different (proxy) server that communicates with the directory server over the network. The platform upon which the predicate proxy core executes may comprise a Windows NT operating system and an Intel-based processor having a storage architecture of memory and disks (that function as a cache). The novel predicate proxy core application may use the standard application programming interfaces (e.g., Win32 APIs) in conjunction with the Windows NT I/O manager and file systems. For the embodiment wherein the predicate proxy core resides on an independent proxy server, the communication protocol used between the proxy server and the LDAP or NDS server is, as noted, the LDAP protocol.

Figure 2:
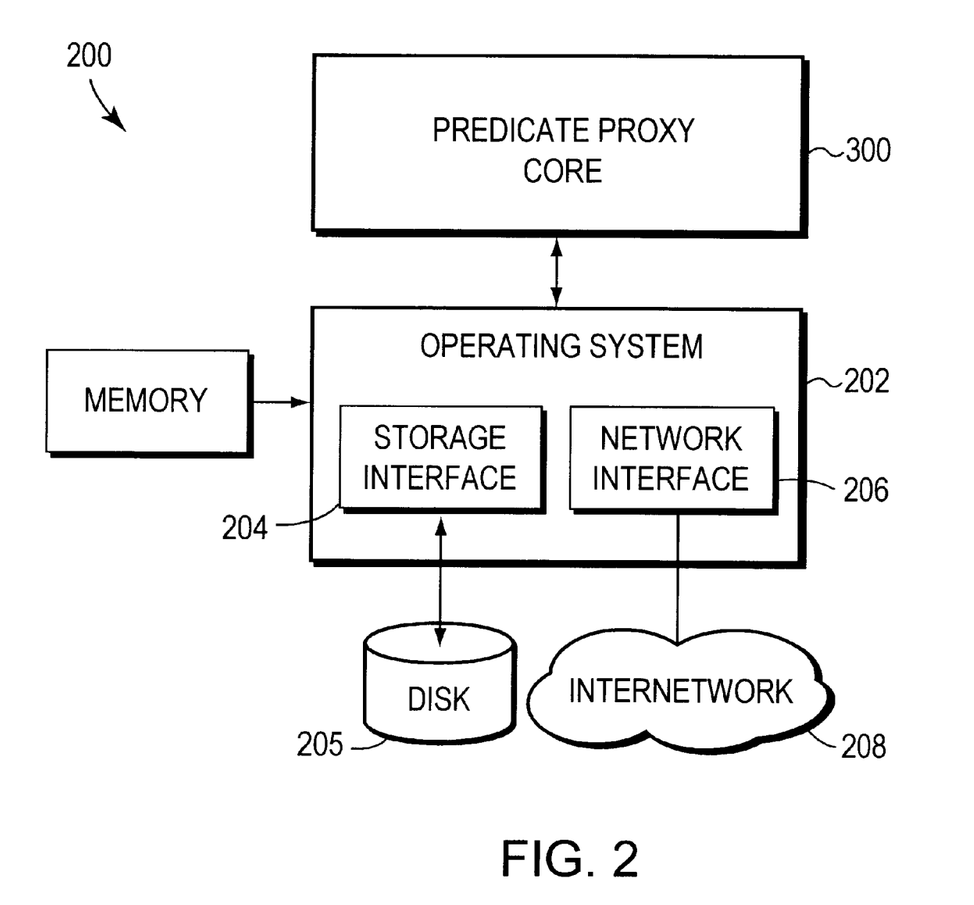
FIG. 2 is a highly schematized diagram of software components of the proxy server including a novel predicate proxy core in accordance with the invention.

FIG. 2 is a highly schematized diagram of software components of the proxy server 200 including an operating system 202 having utility programs that interact with application program components to provide, e.g., a storage interface 204 to a disk drive 205 and a network interface 206, the latter enabling communication between applications over the internetwork 208. The application program components include the novel predicate proxy core 300, shown in FIG. 3, that "front-ends" the remote servers. That is, the proxy server receives a request from a client to access a service from the remote servers and the predicate proxy core attempts to fulfill that request locally from information stored, e.g., in memory or on disk; in either case, the memory and/or disk function as a "cache" for quickly storing and retrieving the services. If it cannot satisfy the request, the proxy forwards the request onto the remote server, which responds by transferring a stream of information to the proxy server. The proxy server forwards the information onto the client and stores the information in its cache.

Specifically, the client issues a query via the LDAP protocol to request certain data stored on the LDAP server. The request conforms to the LDAP protocol and is received by the novel directory proxy server. However, since there are many different categories of data, the proxy server translates the client request to a predicate that essentially "makes sense out of the query". The proxy uses the predicate to search its cache and, if the data is not present, to generate a more directed request to the LDAP directory service (using the LDAP protocol) that results in retrieval and caching on the proxy of data based on the sensible transformation by the proxy.

By functioning as a proxy cache server, an aging algorithm may be used to manage the cached data, resulting in a situation where the requested data has been deleted from the proxy cache. In this case, a request must be made to the source server to retrieve the desired data. The cache of the directory proxy server is a persistence/indexing subsystem having an architecture of both non-persistent and persistent storage. The persistence subsystem facilitates dynamic indexing on demand by preventing thrashing between the proxy cache and the source servers. The data that is retrieved from the LDAP server and cached at entries of the proxy cache is generally "elaborate" and includes data components such as, e.g., the name of a client in a particular area code, the name of a particular company, etc. Each entry of the cache is formed by complex Boolean relationships (predicate) among these data components that may be grouped together and stored on persistent storage (such as disk); the data groups are accessed by IDs that are stored in non-persistent memory.

Indexing is fundamentally non-scaleable, an indexes must become very long in view of the potential increase in directory usage in the Internet. One cannot afford to build indexes on every attribute of the elaborate data; the present invention solves this problem by providing a dynamic indexing technique that enables indexing based on the actual client request/predicate. In other words, organization of the cached entries is based on the predicate.

For example, a request is directed to acquiring information on clients having the title system engineer, which information is not present in the cache of the proxy server. The predicate proxy core generates a directed request to the remote servers to search for the information based on a predicate (title="system engineer") and the returned search results are stored on the cache (based on the predicate) prior to returning them to the client. The next time a query is received at the proxy cache server which requests data having the title system engineer, the proxy can immediately retrieve it from its memory cache rather than accessing the remote LDAP server. In addition, if a subsequent query is issued by another client requesting data with the attributes (title="system engineer") AND (service area="San Jose"), the predicate logic efficiently computes the exact result based on the cached data without consulting the LDAP server. "AND" stands for the Boolean "and" function.

Specifically, the LDAP request received from a client is examined and manipulated by the predicate logic to enable searching in accordance with the dynamic caching technique. If the data is not cached on the proxy, the predicate logic generates a modified LDAP request that is sent to the LDAP or NDS server to retrieve the necessary data. Even though the request issued to the remote server conforms to standard LDAP protocol, the content of that request could be materially different from that issued by the client. The invention lies, in part, in the transformation between requests performed by the predicate logic.

Figure 3:
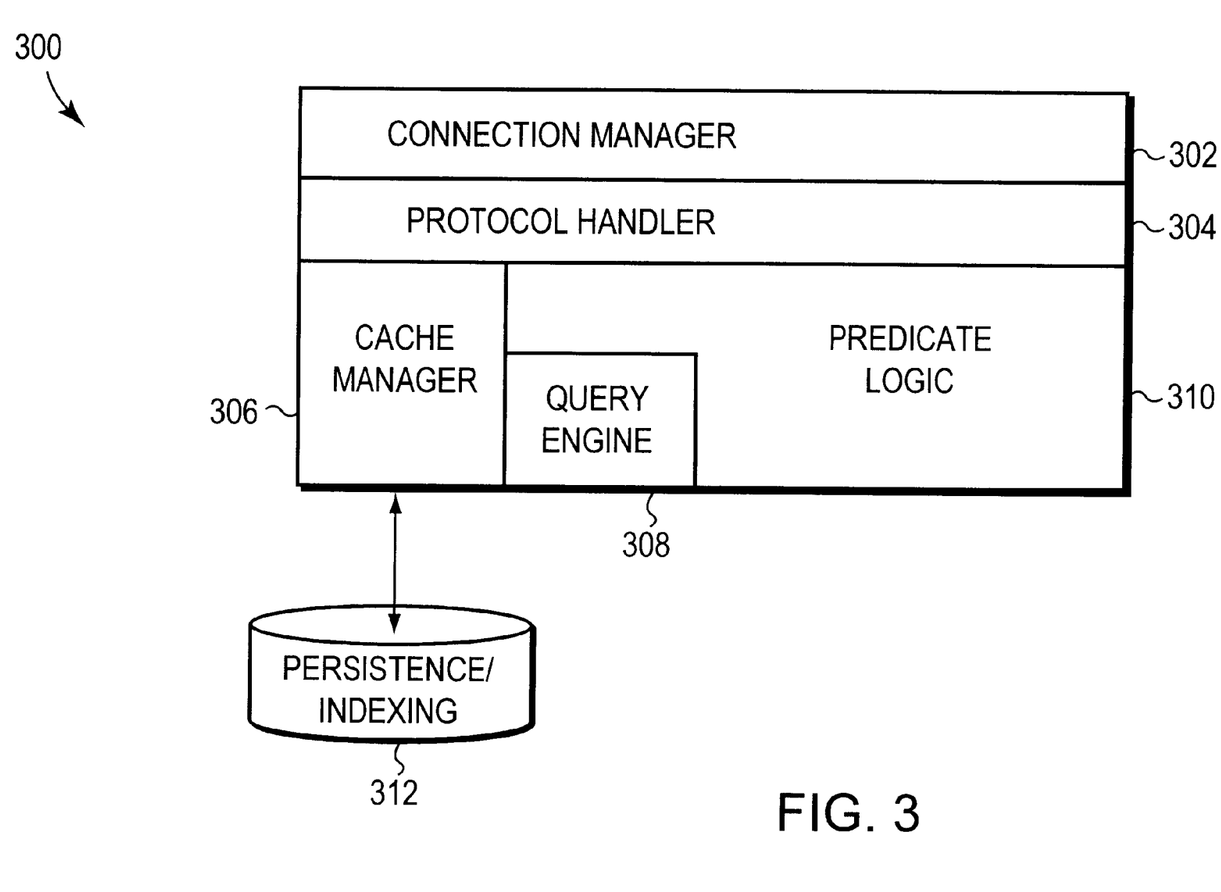
FIG. 3 is a functional diagram of the predicate proxy core including a connection manager, a protocol handler, a cache manager, a query engine, and predicate logic.

FIG. 3 is a functional diagram of the predicate proxy core 300 including a connection manager 302, a protocol handler 304, a cache manager 306, a query engine 308, and predicate logic 310. The connection manager 302 is responsible for maintaining proxy connections to the clients, as well as to the directory servers. Since LDAP/NDAP are connection-oriented protocols, the connection manager may function in accordance with a connection-oriented service, such as TCP. The protocol handler deals with LDAP/NDAP specific marshalling and un-marshalling of arguments to/from the network.

The cache manager 306 is responsible for management of the proxy cache, including managing cache entries. To that end, the cache manager interacts with the predicate logic, the query engine and the persistence subsystem to provide high-level "intelligence" when managing the cache entries. The query engine is responsible for computing total or partial results based on a cache entry and, thus, is generally similar to a search engine of a conventional LDAP/NDAP server. The predicate logic is the core of the directory proxy which implements the dynamic caching technique by computing whether a subsequent query can be subsumed by the current cached results. Unlike a traditional caching system, the dynamic caching technique does not provide a unique one-to-one mapping between a query predicate and a result set.

By "subsumed" is meant that part of a query, or all of the query, may be satisfied from the cache rather than the query submitted to the database server or servers.

Directory Proxy

Figure 4:
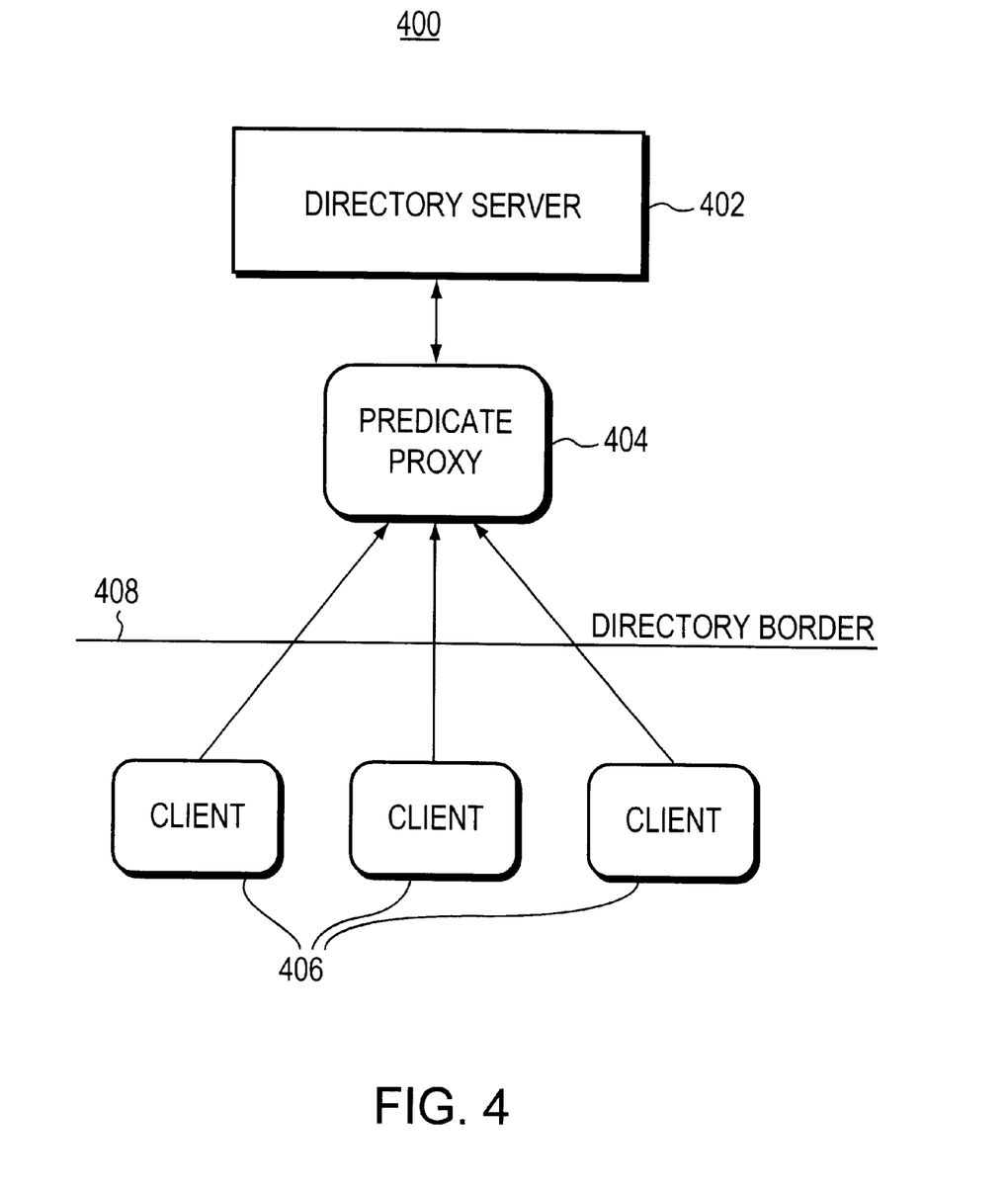
FIG. 4 is a block diagram of a computer database with a proxy server.

Turning now to FIG. 4, there is shown a proxy system 400 with predicate caching intelligence. Directory server 402 holds the database. Directory server 402 may be one database server, or may be a plurality of database servers connected as a distributed database. Predicate Proxy server 404 arranges a predicate in normal form for ease of use, generates requests to directory server 402, and caches response data with indexing by the predicate used to find the data. The "normal form" of the predicate is referred to as first order disjunctive normal form, and will be further described herein below. Clients 406 are client computers used by persons "users" to generate inquiries to the directory. The directory border is shown by line 408.

Advantages of providing an external caching to the Directory Server are:

Reduce common server request through use of a fast cache. Due to the low update rate (compared to read) in directory usage, a good cache system, augmented by an invalidation strategy, can offload a significant part of the replication functionality.

Provide persistence to the cache. The in-memory cache in the Directory server often times can be a scalability bottleneck since under heavy workload, memory based cache system can result in system thrashing due to cache replacement operations.

Provide higher level intelligence. In general, the added value of a cache system depends heavily on the caching intelligence with respect to the usage pattern. Predicate-based cache significantly improves associative access performance.

The combination of predicate caching and the ability to extend cache size to persistent, secondary storage is very powerful in that the predicate proxy essentially acts as a dynamic indexing/query optimization subsystem where the optimization depends completely on the actual client requests.

Predicate Caching

Associative access to the Directory means searching the directory with a search filter, such as 'find all entries with [name="john" and title="director"]. A server with indexing on attributes 'name' and 'title' can efficiently answer this particular query. The core of the problem is that due to flexibility in the directory schema, one can not foresee building an index for every attribute defined in the system. Taking such an approach also can be a performance bottleneck due to the cost of index maintenance. The basic idea behind predicate caching is that, assuming the access patterns are mostly Associative and have repetitive nature, the proxy can cache the search results based on the search predicate and quickly compute either the entire or partial results for subsequent queries. In the above example, if a subsequent search with predicate being [name="john" and title="director" and "office=ORM"] is issued, the proxy can quickly compute the results from its cache without asking the server to perform an exhaustive search, through potentially millions of objects, in the backend.

Components of the Predicate Proxy Core are shown in FIG. 3. Connection Manager 302 is responsible for maintaining proxy connections to the clients, as well as to the directory backend server. Unlike HTTP protocol, LDAP/NDAP are connection-oriented protocols, thus we need to maintain the added complexity at the Proxy side. Protocol Handler 304 deals with the LDAP/NDAP specific marshalling and un-marshalling of the arguments on/off the wires. Cache Manager 306 deals with the management of the cache entries. In addition to the issues in traditional cache management, it needs to interact with the Predicate Logic, the Query Engine, and the Persistence subsystem to have higher level intelligence in managing the cache entries.

Query Engine 308 is essentially the same component as the search engine in a normal LDAP/NDAP server. It is responsible for computing total or partial results based on the cache entry.

Predicate Logic 310 is the core of the system to compute whether a subsequent query can be subsumed by the current cached results. Unlike traditional caching systems where there is a unique and one-one mapping between the key and the cached entry (such as a URL can uniquely identify a cached page), there exists no one-one mapping between a query predicate and a result set because a query may return a plurality of result sets, as is further explained below.

Persistent subsystem 312 deals with large-scale operations, and facilitates dynamic indexing on demand. A persistent storage subsystem, such as disk storage, is needed to prevent thrashing between the cache and the backend. The Query Engine component expects to have close interaction with the persistent storage.

Predicate Logic

The key functions which the Predicate Logic 310 must handle are as follows.

Equivalent forms between LDAP/NDAP search filter expression and SQL so that the system works for a variety of protocols.

Predicate Description: This is the mechanism to identify a particular predicate, much like a URL can be used to identify a HTML cached page. The first order disjunctive normal form of the predicate provides this mechanism, as described below.

Cache Completeness: This has to do in computing whether a subsequent query with a particular predicate can be completely subsumed by the existing cached result set. If not, how to compute the difference and re-write a sub-query to the backend server is determined. Again, the first order disjunctive normal form of the predicate provides this mechanism, as described below.

Cache Currency: Since the proxy is sitting between all the directory clients and the server, updates to the directories by the clients are also visible to the proxy. Given an update, the set of cached entries being invalidated by the update is determined, and the cache entries are invalidated.

Broadly stated, the predicate logic receives a conventional LDAP data stream protocol format, transforms it into a predicate probe used to search its internal cache and, if the data is not present in the cache, generates another possibly different) LDAP request that is sent to the LDAP and/or NDS servers to acquire (and thereafter cache) a more-specific data content.

Figure 5:
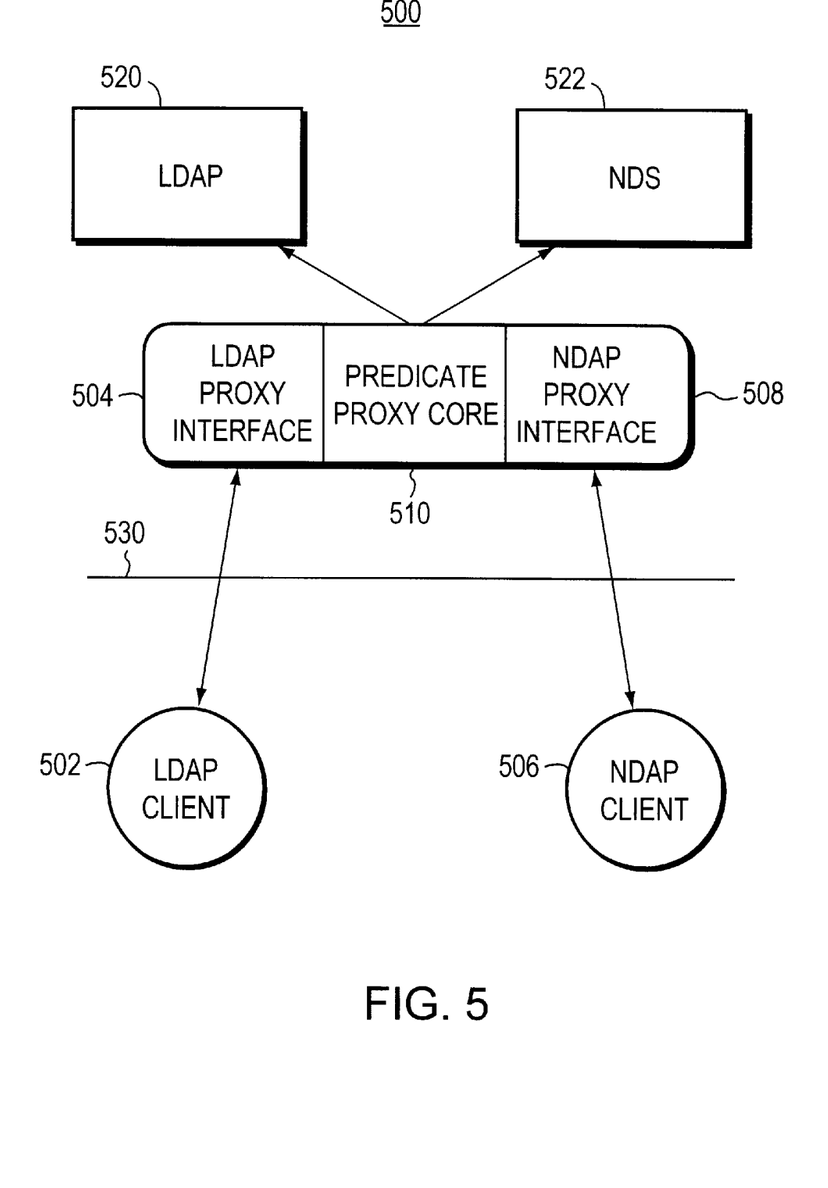
FIG. 5 is a block diagram of a distributed database system using different types of database servers.

Turning now to FIG. 5, there is shown a directory service 500 having both an LDAP client 502 and a NetWare Directory Services system using Novell Directory Access Protocol NDAP. LDAP client 502 submits queries to LDAP proxy interface 504. NDAP client 506 submits inquiries to NDAP proxy interface 508. LDAP proxy interface 504 and NDAP proxy interface 508 arrange their respective queries into a common format and hand the queries in a common format to predicate proxy core 510. Predicate proxy core 510 generates a request to either a LDAP server using an LDAP format, or generates a request to NDS server 522 using an NDS format. In either event, predicate proxy core 510 maintains a cache indexed by predicates submitted by either LDAP client 502 or NDAP client 506. Line 530 marks the directory border.

LDAP Predicate Cache

A design assumption is that predicate requests from clients conform to the LDAP search filter specification, as defined in the LDAP RFC. A pseudo code representation of a function handling requests from clients follows.

The algorithm for the LDAP Predicate Cache makes use of two key data structures in the Predicate Logic Module (PLM):

1. Pcache Table (PcacheTable): A table of Pcache elements, where each Pcache element consists of the Predicate description, and the list of IDs of the entries satisfying the predicate. The Pcache table is guaranteed to be up to date and correct.
2. Hint Table (HintTable): A table of Hint elements, where each element consists of a predicate description, and a reference to the element in the Pcache Table. The Hint Table stores a list of predicates that can be subsumed by some entries in the Pcache Table.

In order to limit Proxy memory consumption, each Entry is persistently stored in the Proxy local disk 312 of FIG. 3, with only IDs of the cached entries stored in main memory.

Algorithm for Pcache Logic Module (PLM):
{
  //Normalize filter into predefined order or disjunctive form, while
  // preserving equivalence
  NewFilter=NormalizeFilter (inputFilter);
  For each disjunctive form f in NewFilter
  {
    candidates=Check Pcache element for subsumption
    If not met,
    Candidates=check HintTable for subsumption
    If not met,
      Add f into to LDAP
  }
  //now we have candidates holding the ID set from Cache
  //Ask LDAP backend whatever we can not answer
  From LDAP=AskLDAP (to LDAP);
  For each entry in FromLDAP, check for existence in Pcache Persistent File Collect IDs.
  Update Pcache Table.
    //Since the candidates are always superset of the final result
    //We need to run through the localFilter
  Final IDs=test_filter(candidates, localFilter);
  Results=MergIDs (Final IDs, FromLDAP IDs);
  Send result back to client;
}

Predicate Normalization

The Predicate Normalization function puts the user query into a predicate form which is sorted for use in the invention. Predicate Normalization is the first stage for identifying predicates and comparing them to locate their equivalence in the later stages of practicing the invention. Normalization occurs on the LDAP FILTER object. The FILTER object is the internal representation of the predicate. The LDAP predicate can be simple or complex. The normalization algorithm normally needs to be applied to complex filters only, and not to simple filters. Complex filters are build by applying the binary operators "&" and "|". The "&" operator is known as the "AND" operator and the "|" is known as the "OR" operator. The LDAP protocol specifications uses the prefix notation for the binary operators, that is, operator first.

An example of the "&" operator:

&(A=5)(B>7), would yield a result set which would have all entry objects whose attribute "A" has a value equal to "5" AND the attribute "B" with value greater than "7".

An example of the "|" operator:

|(A=5)(B>7) would yield a result set which would have all the entry objects whose attribute value "A" has a value equal to "5" OR the attributes "B" with value greater than "7". This would also include all entry objects which have the attribute "A" contain the value "5" and attribute "B" with a value greater than "7".

The individual elements in the filter are arranged in a desired order by a comparison function. In the above example (A=5) is one element and (B>7) is the second element.

The comparison function performs a comparison of the individual elements, and the function ordinarily uses three steps. The first step involves comparing the operators in the element. The predicate statements associated with the elementary operators are then placed in the order of the operators. The set of applicable operator are ">", ">=", "=", "<", "<=", "!", "&" and "|". The operators are sorted into order, where the order is based on numbers used to represent the operators. For example, each operator may be represented by its ordinary ASCII numerical code. The comparison function then orders the operators, and their associated predicate statement, in order of ascending numbers, or descending numbers, as desired. If two elements have identical operators, then the order is established by comparing the attribute names, again using numbers representing the symbols of the attribute names. Again, the ordinary ASCII numbers representing the symbols, that is the letters, are used to establish the order of the predicate statements. If the attribute names also, match then the attribute values are compared against one another by the comparison function. The comparison function continues operation until all of the primitive predicate statements are placed in order.

When placed in order as described above, the complex predicate is referred to as being in first order disjunctive normal form P.

Figure 6:
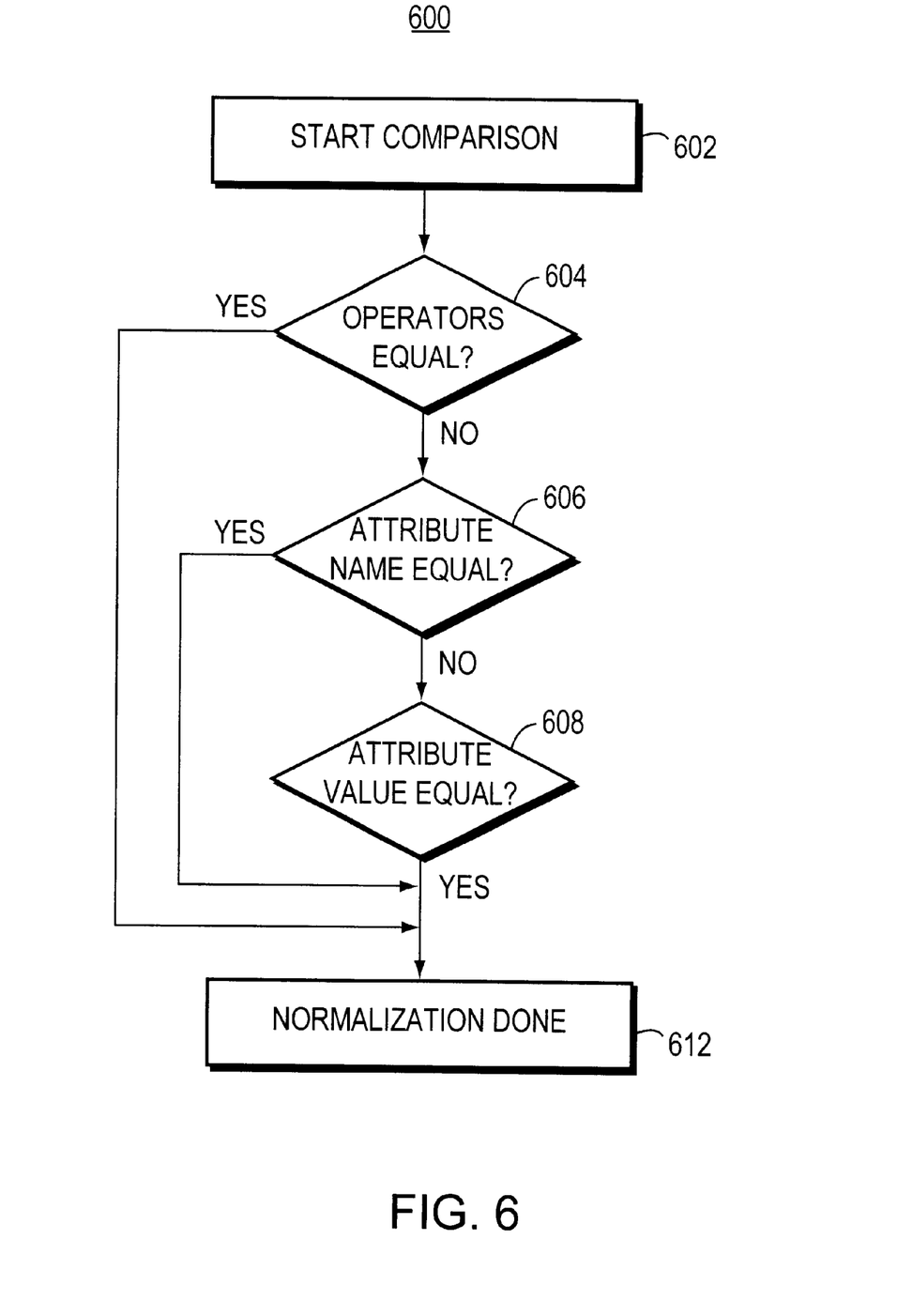
FIG. 6 is a flow chart of a predicate normalization function.

Turning now to FIG. 6, there is shown flow chart 600 for the comparison function which puts the primitive predicates in first order disjunctive normal form. The process starts at box 602. At box 604 the equality of operators in the predicate primitives are compared and sorted into order by their representative number. At box 606, if the operators are equal, the predicate primitives are sorted into order based on a comparison of attribute names. At box 608, if the attribute names are equal, the predicate primitives are sorted into order based on the values assigned to attributes. After all predicate primitives are sorted, the function goes to box 612, and the normalization is done.

Predicate Subsumption with HintTable Optimization

Predicate subsumption is the step where a decision is made regarding whether or not data cached in the Proxy server can be used to serve the current client request. This step is necessary since the predicate cache system differs from a conventional caching system in that there does not exist a one-one mapping relationship between the reference address (in this case, an LDAP search predicate) and the cached results. For example, ordinary one-to-one mapping of cached results is used in the two exemplary cases: the L2 cache in computer architectures; and in Web caching systems, the one-one mapping relationships are the (memory address, memory cell) and the (URL, cached web page) respectively.

In the present invention, the cached results are stored using a mapping based upon the primitive predicate.

Following the steps in the predicate normalization process described above, we have a 'normalized' predicate in first order disjunctive normal form, P. The goal of the Predicate Subsumption process is to determine whether a client predicate in a request for data, can be 'subsumed' by the predicates in the current cached objects. That is, the predicate objects are used as the index into the cached results. A data structure, PcacheTable is constructed to facilitate the process. PcacheTable is a table of elements where each element is a tuple of <predicate, result set IDs>. To reduce the Proxy server memory usage, the LDAP entries returned from the LDAP backend(s) are stored persistently on the Proxy local disk with unique IDs assigned to the local entries. The result set in the PcacheTable then is reduced to a set of entry IDs.

The Predicate Subsumption algorithm is outlined below. The following example illustrates the key ideas.

Assume the first search request into the Proxy Server is (Title=consultant). Since the cache is cold, the PcacheTable is empty. The Proxy Server then asks the LDAP backend for the same query and gets back a result of, say, 6 entries satisfying the query. The Proxy Server then puts these 6 entries onto its local storage and assigns result set identification IDs 1 to 6 to them. The PcacheTable now has one element of <(Title=Consultant), <1,2,3,4,5,6>>

Let's assume then the second LDAP query is ((Phone begins with 408) AND (Tile=Consultant)). We then take each of the primitive forms in the inquiry predicate in the normalized form, and check it against every predicate in the PcacheTable. In this case the first normal form, (Phone begins with 408) failed but the second normal form, Title=consultant) has an exact match with one of the elements in the PcacheTable, which means the second query can be computed solely by the Proxy Server without asking the LDAP backend(s). The Proxy Server simply retrieves the cached responses to the inquiry predicate (Title=consultant) from its cache.

Figure 7:
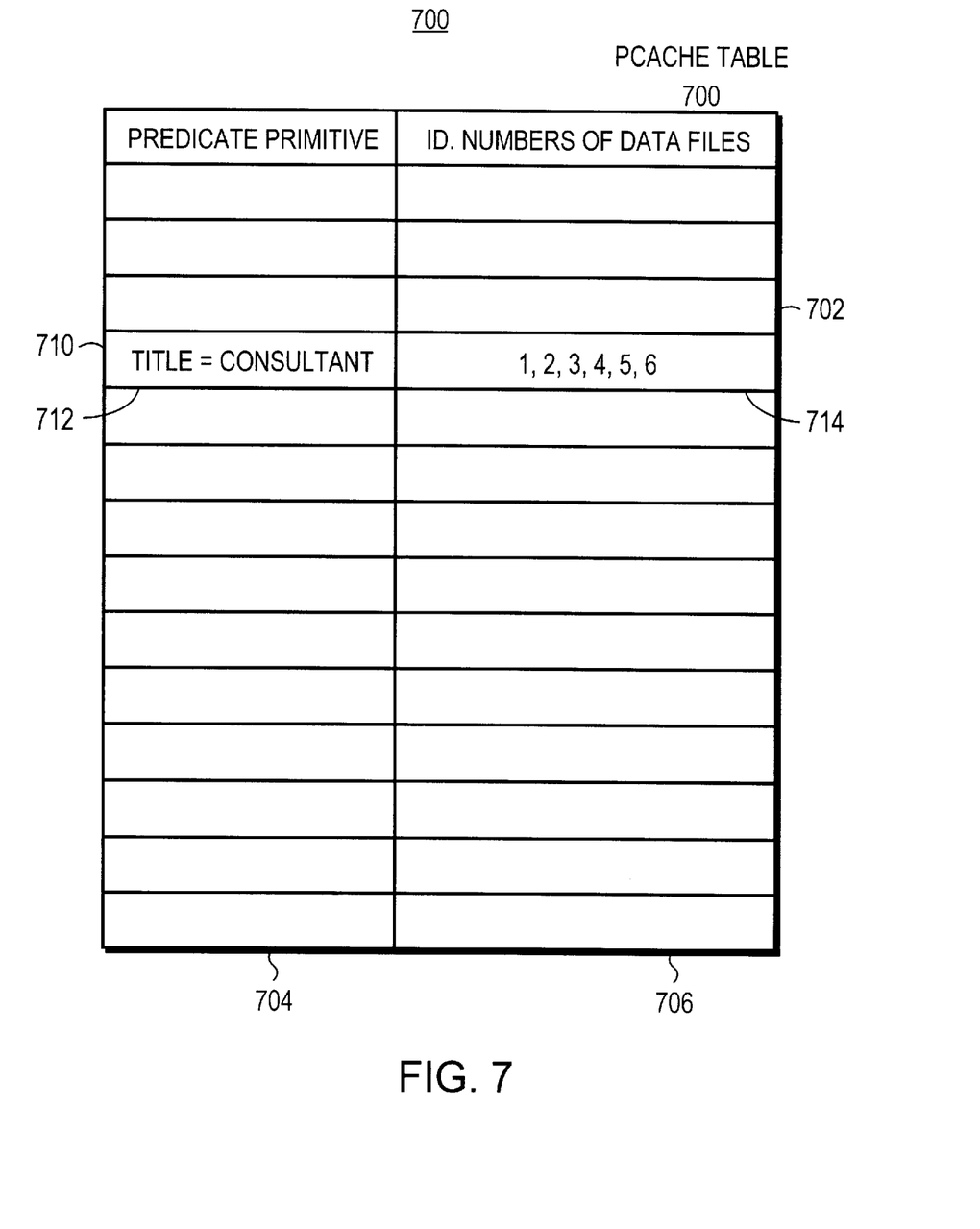
FIG. 7 is a block diagram of a Pcache Table.

Turning now to FIG. 7, a typical PcacheTable 700 is shown. An entry is in a row such as row 702. An entry has two parts, a first part in column 704 contains a predicate primitive. A second part of an entry has identification numbers (IDs) of data files in the database which satisfy the predicate primitive of the entry, and is in column 706. As an example, the above example is shown as an entry 710. The predicate primitive "Title=Consultant" is in field 712 of entry 710, and the IDs of data files in the database are in field 714 of entry 710.

When the size of the PcacheTable becomes large, and because the subsumption calculation requires looping through each element's predicate, then the subsumption calculation becomes very time consuming. A good way to optimize this process is to 'remember' all the subsumption tests we have done for all the queries. In this case we can construct a HintTable with one element as <(((Phone begins with 408) AND (Title=Consultant)), (1)> meaning we have done the subsumption computation so that if next time there's a normal form of ((Phone begins with 408) AND (Title=Consultant)), we can immediately jump to the PcacheTable and retrieve the results of the first element in the table.

Searching the HintTable is quick because the primitive predicates are arranged in order of the number representation of their components, as described above, that is they are in first order disjunctive normal form, P. The client operands can be compared with the HintTable operands, and in the event of a match, the search is narrowed down by examining the elements of the predicates in the order presented by first order disjunctive normal form.

Figure 8:
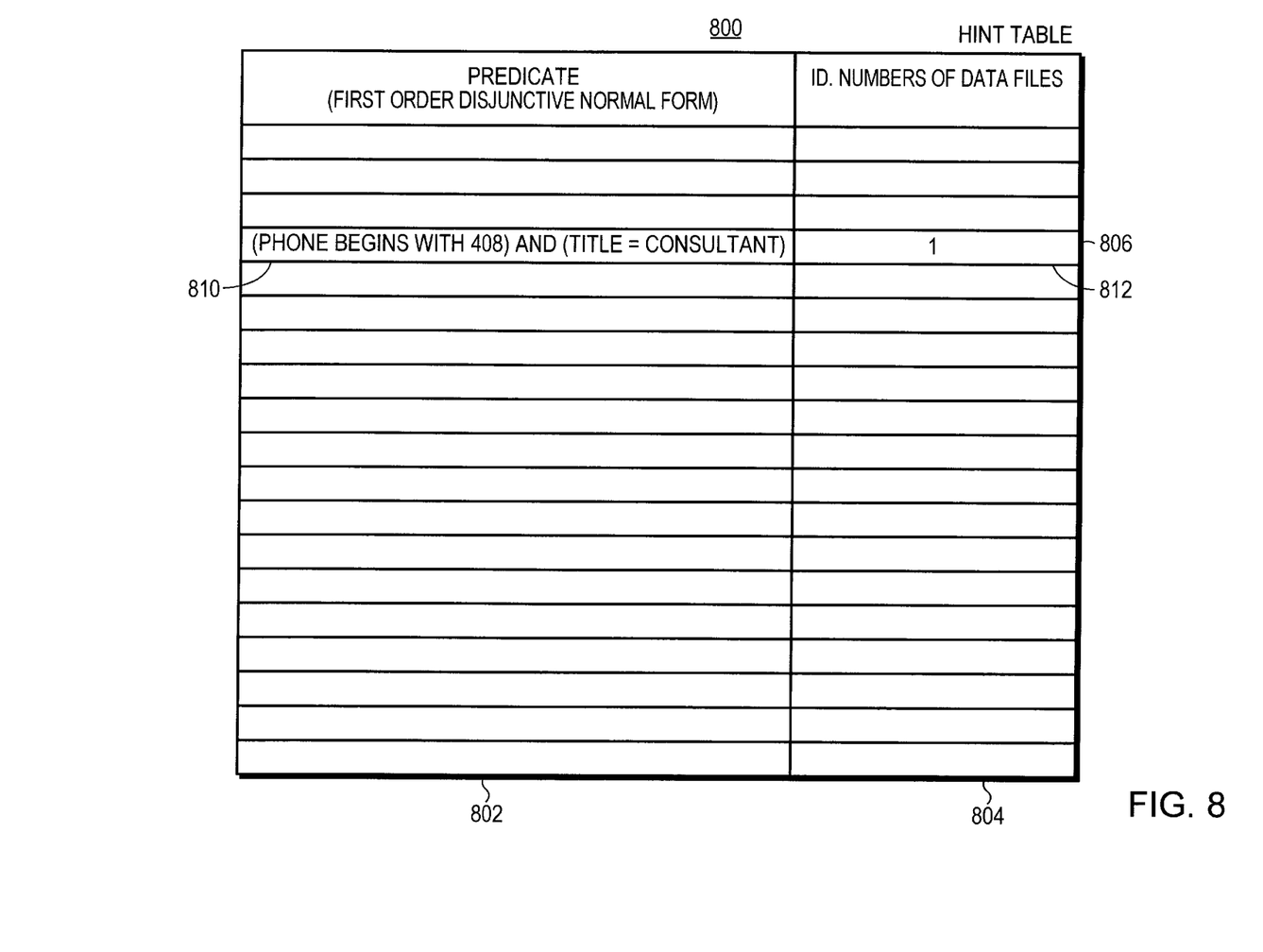
FIG. 8 is a block diagram of a HintTable.

Turning now to FIG. 8, there is shown an exemplary hint table (HintTable) 800. Column 804 holds as an entry a compound predicate made up of primitive predicates in first order disjunctive normal form. Column 804 holds identification numbers of data files satisfying the predicate of column 802 for the entry. As an example entry 806 holds the results of the above example, where a compound primitive predicate of the form "((Phone begins with 408) AND Title=Consultant))" is shown in field 810, and an ID, "1", of a data file satisfying this predicate is shown in field 812.

Distributed Database with Multiple Backend LDAP Servers

The Predicate Caching Directory Proxy server acts as a Proxy to multiple backend LDAP servers. In order to do this the server is designed with an architecture in a manner by which it keeps track of initiating points of all the LDAP servers. Each LDAP server represents either a whole Directory tree or a portion of the tree. A complete Directory tree can be formed by virtually joining the different LDAP servers to form a well-defined tree. By retaining the information about the initiating points of the portions of tree represented by the different LDAP servers the Predicate caching Directory Proxy server keeps complete knowledge of the entire Directory tree.

The initiating point and the range of data stored in an LDAP server is designated by a predicate, that is as a set of primitive predicates. These predicates are arranged in first order disjunctive normal form to facilitate comparison with a client predicate.

That is, the Predicate caching Directory Proxy server has a table which has entries showing the range of predicate values held by each LDAP server. That is, the table has pointer predicates which point to their LDAP servers, and the pointer predicates give the initiating point and the range of variables contained in the LDAP server pointed to. By comparing the client predicates with the entries in the table, the Predicate caching Directory Proxy server determines which LDAP servers in the distributed arrangement of LDAP servers to send the inquiry to. The Predicate caching Directory Proxy server then sends the predicates only to those LDAP servers containing the range of predicate values requested by the client.

When the Predicate Caching Directory Proxy server is not in the position to satisfy the request for data from the client due to the absence of those elements in its cache, it contacts the backend LDAP servers to satisfy them. Knowledge of the initiating points of the different LDAP backend servers aids in helping select the accurate backend that will be effected by the request. The request is then routed accordingly to the appropriate server. This idea of routing the request using a range of predicate values to the backend LDAP servers without wasting any resources is a unique feature in the field of inquiries into databases.

The Predicate Caching Directory Proxy server maintains a configuration file which stores the information about the initiating points and range of data stored on each backend LDAP server to which it proxies.

The format for stating the details of the backend is as follows.

<backendaddress#><Initiating point><IP address><Port Number><Admin login id><Admin Password> backendaddress#→is the IP Address of the specific backend whose relevant information will follow.

Initiating point→The initiating point of the Directory tree hosted by this particular LDAP backend.

IP address→The IP address for the LDAP backend server.

Port Number→The port number on which the LDAP backend would be listening.

Admin login id→The administrator login identifier.

Admin Password→The administrator password.

An example of the configuration file and entries relevant to this discussion is shown as follows.

backends 4
This directive will provide the root dn of the backend and its IP address
backendaddress1 "ou=s2, ou=s3, o=water, c=us" 151.155.35.118 389 "cn=manager, o=water, c=us" novellpass
backendaddress2 "ou=s4, ou=s3, o=water, c=us" 151.155.35.149 389 "cn=manager, o=water, c=us" novellpass
backendaddress3 "ou=s5, ou=s3, o=water, c=us" 151.155.35.118 389 "cn=manager, o=water, c=us" novellpass
backendaddress4 "ou=s4, ou=s3, o=water, c=us" 151.155.35.149 389 "cn=manager, o=water, c=us" novellpass The keyword backends indicates the number of backend LDAP servers that are supported. The keywords backendaddress# are the details of the individual backend LDAP servers.

To see how the system identifies the backend, to whom the actual query should be sent, let us look at an example. We will use the above configuration for the backend.

Let us say that the incoming query is searching for all objects with attribute "Title=Consultant" under the search base of "ou=s5, ou=s3, o=water, c=us". From our comparison routine, it is identified that only backend represented by backendaddress3 will be effected as it has the only initiating point mentioned via the configuration file.

On the other hand let us say that the incoming query was for all objects with attribute "Title=Consultant" under the search base "ou=s3, o=water, c=us". Based on the comparison routine, it is clear that all the backends will be effected by the search and hence the search request is dispatched to all four of the backend LDAP servers.

Figure 9:
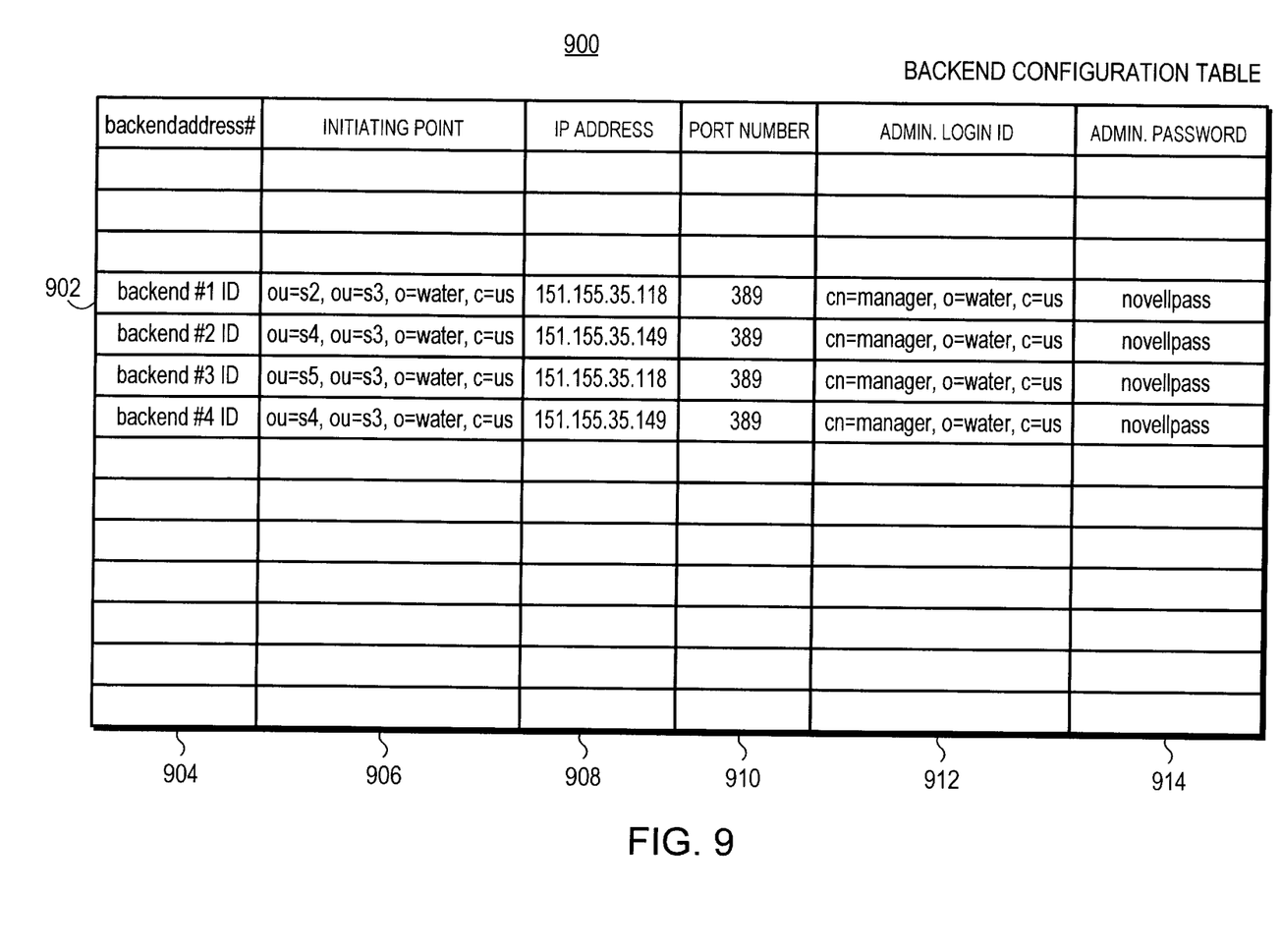
FIG. 9 is a is a block diagram of a Backend Configuration Table.

Turning now to FIG. 9, there is shown a Backend Configuration Table 900. An entry, such as entry 902 is made up of a plurality of fields, each field being in a separate column of Backend Configuration Table 900. Column 904 holds the backendaddress # as described above. Column 906 holds the initiating point as described above. Column 908 holds the IP address for the LDAP backend server as described above. Column 910 holds the port number used by the proxy server to reach the backend server, as described above. Column 912 holds a login needed administratively to log into the backend server, as described above. Column 914 holds the administrative password needed to log onto the backend server, as described above.

Figure 10:
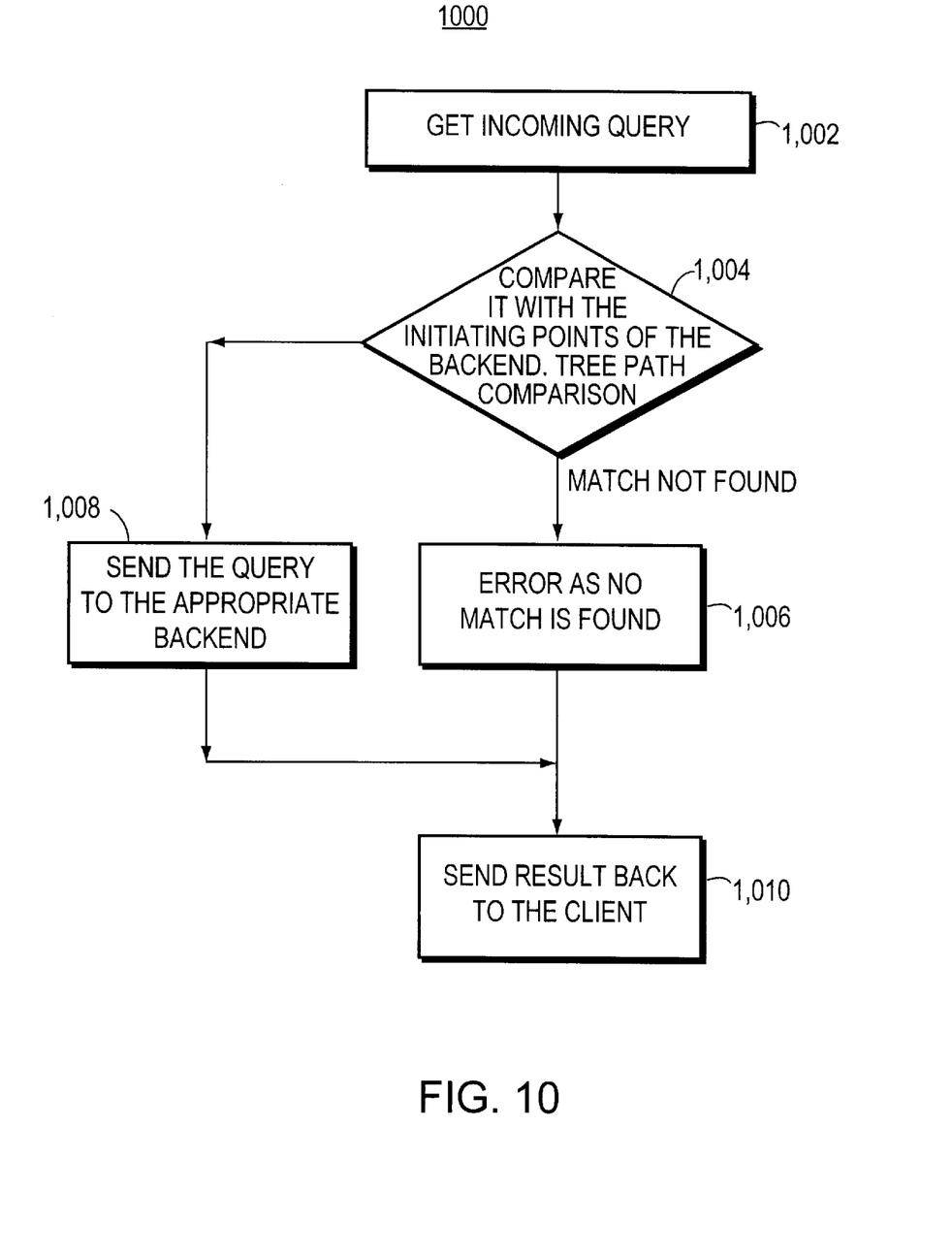
FIG. 10 is a flow chart of a Backend Determination Function.

Turning now to FIG. 10, there is shown a flow chart 1000 of a Backend Determination Function. At block 1002 the process starts by getting an incoming Predicate of a query. At test block 1,004 the process compares the incoming Predicate with the initiating points of the backend servers, by reference to a table such as the Backend Configuration Table of FIG. 9. If no match is found, the process recognizes that the query cannot be answered at block 1,006, and the error message is returned to the client at block 1,010.

In the event that block 1,004 finds a match, the process goes to block 1,008 where the query is transmitted to the appropriate backend database server, for example as specified by the IP address entry in the Backend Configuration Table of FIG. 9. The result, that the query has been transmitted, and the response of the backend server to the query, is transmitted to the client at block 1,010.

Furthermore, the terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

It is to be understood that the above described embodiments are simply illustrative of the principles of the invention. Various other modifications and changes may be made by those skilled in the art which embody the principles of the invention and fall within the spirit and scope thereof.

What is claimed is:

1. A method of indexing information stored in a distributed directory, comprising:

using a predicate to designate said information, said predicate expressed as a plurality of primitive predicates, individual predicates of said plurality of primitive predicates joined by logical connectors;

representing said logical connectors by numbers, and representing terms in each predicate by numbers, said numbers chosen so that each different logical connector and each different term in said plurality of predicates is represented by a unique number;

sorting said logical connectors and said predicates in numerical order of said unique numbers representing said logical connectors and said terms, to create a normal form of said predicate;

storing said information into a directory and using said normal form of said predicate as an index to said information stored in said directory.

2. The method as in claim 1 further comprising:

submitting a client predicate by a client to designate desired information;

sorting said client predicate into a normal form of said client predicate;

comparing said normal form of said client predicate with index predicates to stored information stored in a directory; and, retrieving stored information when said normal form of said client predicate matches said index predicate.

3. The method as in claim 1 further comprising: choosing said directory as a database.

4. A method for retrieving data from a plurality of directory servers, comprising:

designating each directory server, of said plurality of directory servers, by a designation predicate giving a range of data values stored in said each directory server;

using a client predicate to indicate desired information;

comparing said client predicate with at least one of said designation predicates to determine which directory servers may contain information requested by said client predicate, and in the event that a match between said client predicate and a particular designation predicate indicates that at least a portion of said desired information may be stored on a particular directory server pointed to by said particular designation predicate, sending an inquiry to said particular directory server for said desired information;

retrieving desired information from said particular database server in the event that said client predicate designates information stored on said particular database server, as retrieved information; and, storing said retrieved information in a memory of a client computer.

5. A method of indexing information stored in a distributed directory, comprising:

using a predicate to designate said information, said predicate expressed as a plurality of primitive predicates, individual predicates of said plurality of primitive predicates joined by logical connectors;

representing said logical connectors by numbers, and representing terms in each predicate by numbers, said numbers chosen so that each different logical connector and each different term in said plurality of predicates is represented by a unique number;

sorting said logical connectors and said predicates in numerical order of said unique numbers representing said logical connectors and said terms, to create a normal form of said predicate;

storing said information into a particular directory of said distributed directory, and using said normal form of said predicate as an index to said information, and using a directory index based on a normal form of a predicate to designate said particular directory.

6. A distributed directory comprising:

a plurality of directory units, each said directory unit designated by a designation predicate, said designation predicate giving a range of information stored on its particular directory unit;

a memory to hold a client predicate, said client predicate seeking information which may be stored in said distributed directory, said client predicate submitted to said distributed directory by a client;

a processor to compare said client predicate with at least one of said designation predicates in order to find a directory unit which may have information requested by said client predicate stored therein;

a search engine to search any of said directory units which are indicated by their designation predicates as directory units which may have said information requested by said client predicate stored therein, and said search engine producing discovered information as output where said discovered information is information requested by said client predicate and which was found on a particular directory unit by said search engine;

an output unit to transfer any discovered information to said client.

7. Electromagnetic signals travelling on a computer network comprising: said electromagnetic signals to operate the process of claim 1.

8. Electromagnetic signals travelling on a computer network comprising: said electromagnetic signals to operate the process of claim 4.

9. Electromagnetic signals travelling on a computer network comprising: said electromagnetic signals to operate the process of claim 5.

10. A data structure stored in a computer memory, comprising:

a predicate sorted into normal form, said predicate designating a range of values stored in a particular directory server of a distributed directory system, said distributed directory system having a plurality of said particular directory servers;

said predicate having at least one logical operator and having a plurality of elements, said logical operator and said plurality of elements each represented by a number, and said normal form of said predicate formed by sorting said numbers representing said logical operators and said plurality of elements into numerical order.

* * * * *